United States Patent Office 3,748,287
Patented July 24, 1973

3,748,287
PROCESS FOR PREPARING MICROPOROUS
CELLULAR POLYMERIC STRUCTURES
Kung Hsing Lee, Wilmington, Del., assignor to E. I. du
Pont de Nemours and Company, Wilmington, Del.
No Drawing. Filed Sept. 1, 1971, Ser. No. 177,172
Int. Cl. B29d 27/04
U.S. Cl. 260—2.5 AY    6 Claims

ABSTRACT OF THE DISCLOSURE

A process for preparing microporous cellular polymeric structures which comprises (a) dissolving the starting polymer in a non-aqueous solvent; (b) adding thereto a chlorofluorocarbon to form a dispersion of polymer in solvent; (c) forming said polymer dispersion into a regular continuous structure; (d) removing the solvent from the polymer dispersion structure; and (e) removing the chlorofluorocarbon from the structure.

BACKGROUND OF THE INVENTION

Field of the invention

This invention relates to a novel process for preparing microporous cellular polymeric structures and more particularly to a process for preparing microporous cellular structures of polymers in the presence of selected chlorofluorocarbons.

Description of the prior art

Much work in this field has been directed to the preparation of polymeric sheets which share many of the qualities of leather. The polymeric products desirably have adequate strength for use in clothing, particularly shoe uppers, and must also be vapor-permeable while resisting liquid water penetration. These requirements have led to the development of porous polymeric sheets of a number of different polymers, the most common being polyurethane and polyvinylchloride. The polymeric sheets for use in wearing apparel must be able to withstand repeated flexing, and must be resistant to abrasion and tearing. Resistance to tearing has, however, been a problem, and many processes may be found wherein the polymeric material is impregnated in a woven or non-woven substrate in an attempt to attain the necessary strength and resistance to tearing. Incorporation of such a fibrous substrate, however, makes reworking of scrap or below specification product difficult, while unitary structures need only be redissolved.

Much work has also been done to develop techniques for obtaining the proper kind of porosity in the finished sheet. The pores should be "micropores," so small as to at least not be discernible by the naked eye. Usually desired porosity is obtained by dissolving the polymer and causing it to resolidify in the presence of an inert material which can then be removed from the polymer structure, leaving it in a porous condition. The inert material is generally in one of three categories; either an inorganic salt, an organic liquid, or water.

A common technique employed for polymer isolation is the dissolving of a polyurethane in dimethylformamide and the precipitation of the polymer in the desired form with water. The manner in which the inert material is separated from the polymer product and the solvent, and also the manner in which the solvent is recovered have much to do with the economy of the process as a whole. Where an organic liquid is used as the inert pore former, it should be readily separable from the solvent, normally by fractional distillation without excessive power requirements for heating or cooling.

SUMMARY OF THE INVENTION

The present invention is directed to a process for preparing microporous cellular polymeric structures.

The process comprises the following steps:

(a) a normally solid polymer is dissolved in a non-aqueous solvent or mixture of non-aqueous solvents;

(b) a liquid chlorofluorocarbon or a mixture of liquid chlorofluorocarbons is then added in an amount sufficient to coagulate the polymer and form a dispersion of polymer in solvent, the selected chlorofluorocarbons should each have 4 or less carbon atoms;

(c) the resulting polymer dispersion is then formed into a regular continuous structure;

(d) the solvent is removed from the resulting polymer dispersion structure; and (e) the chlorofluorocarbon is removed from the structure.

DESCRIPTION OF THE INVENTION

In the formation of microporous cellular structures composed of polymers, a polymer is normally solubilized and the resulting polymer in solution is then coagulated in some manner—by removal of solvent, cooling to a temperature of lower solubility, addition of a precipitant or some other operation to form a precipitated solid polymer structure. Formation of the precipitated solid structure in the presence of non-solvent liquid or solid promotes the cellular structure desired. It has now been found that certain chlorofluorocarbon compounds offer unique advantages when used as cosolvents and precipitants in processes of this type. When used according to the process of the present invention, a particularly desirable composition of microporous cellular structure is obtained, which structure possesses the qualities of permeability, strength, flexibility, abrasion resistance and resistance to tearing which make it suitable for use in wearing apparel and shoe uppers without the incorporation of a fibrous substrate.

In the process of this invention, a normally solid polymer is dissolved in a suitable non-aqueous solvent, which may be chosen from a number of chemical types such as amides, ethers, halides, ketones and the like. Among the useful solvents are dimethylformamide, methylene chloride, methyl ethyl ketone, diethyl ether, dimethylacetamide and tetrahydrofuran. Preferred solvents are methylene chloride and dimethylformamide. The degree of solubility of the polymer in the solvent selected is not critical but is preferably at least 5%. Also, while not critical, the solvent will normally have a fairly low boiling point, i.e., less than 100° C., since purification for re-use will probably be accomplished by distillation. The solvent may be a single species or may be a mixture of any of the useful solvents.

A wide variety of normally solid polymers may be used in the process of this invention, e.g., polyacrylics, polystyrene, polyamides, polyvinyl halides, polyurethanes and mixtures thereof can be used. The preferred polymers are polyurethane or mixtures of polyurethane and polyvinylchloride. These polymeric types have been found to yield cellular structures of superior properties, especially as regards strength and permeability. When using a mixture of polyurethane and polyvinyl chloride, the proportion of polyvinyl chloride can be as high as 75%. A preferred mixture is one containing about 77% polyurethane and 23% polyvinylchloride. The ratio of polyurethane to polyvinylchloride by weight may thus be 4:3–1:3. When polyvinylchloride is used as the major constituent, it is permissible to add also the usual proportion of plasticizers, such as the various phthalate esters normally employed with this polymer. Of course a wide variety of properties may be exhibited by species of all synthetic polymers. Variations in the monomers used, molecular weight of product, and polymerization conditions employed lead to products possessing different properties. Additional polymers, useful in this invention, are disclosed in U.S. Pat. 3,100,721.

Formation of the polymer solution can be carried out at room temperature or at any temperature up to the boiling point of the solvent. Elevation of the temperature tends to dissolve the polymeric constituents more quickly. Good agitation should be used to promote dissolution. Where mixtures of polyvinylchloride and polyurethane are used, it is preferable to dissolve the vinyl polymer first, then to add and dissolve the polyurethane. Where a mixture of solvents is used, the solvents are mixed first, then the polymers are dissolved.

A chlorofluorocarbon coagulant, which is miscible in the solvent, is then added to the resulting polymer solution in an amount sufficient to initiate coagulation of said polymer thus forming a dispersion of the polymer in solvent. Care should be exercised to prevent the addition, however, of sufficient coagulant to cause formation of a separate liquid phase which precipitates the polymer in strings and globs of solid instead of maintaining it in the desired dispersed condition.

In some cases the chlorofluorocarbon used as coagulant can be employed in the dual role of cosolvent and coagulant, since with some polymers these chlorofluorocarbon compounds have shown synergistic solvent properties. In such cases the chlorofluorocarbon is added progressively at first serving as a cosolvent and then, when the amount of chlorofluorocarbon present has reached the point where it effects coagulation of the polymer, functioning as a coagulant. The chlorofluorocarbon compounds are found to be particularly useful as polymer cosolvents at elevated temperatures but nonsolvents at lower temperatures. In order to promote ease of separation by fractional distillation, it is best that the solvent have a boiling point somewhat different from that of the coagulant. Preferably the solvent will have a lower boiling point than the coagulant employed, so that during final drying of the polymer structure the residual solvent will be removed at a faster rate than the nonsolvent coagulant. Concentration of solvent in the polymer structure of this stage would tend to dissolve and impair the cellular polymer structure.

The chlorofluorocarbon cosolvent/coagulants useful in the process of this invention include those aliphatic chlorofluorocarbons of up to and including 4 carbon atoms. A fluorine to chlorine ratio of from 1:5–2:1 is preferred. Examples of useful chlorofluorocarbons include 1,1,1,2,2,-pentachloro-2-fluoroethane,
1,1,2,2,-tetrachloro-1,2-difluoroethane,
1,1,1,2-tetrachloro-2,2-difluoroethane,
1,1,1-trichloro-2,2,2-trifluoroethane,
1,1,2,2-tetrachloroperfluorocyclobutane,
1,2,-dichloroperfluorocyclobutane,
1-chloroperfluorocyclobutane,
1,1,2,-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane and mixtures thereof.

Preferred members of this group are 1,1,2,2-tetrachloro-1,2-difluoroethane,
1,1,1,2-tetrachloro-2,2-difluoroethane,
1,1,2-trichloro-1,2,2-trifluoroethane and
1,1,1-trichloro-2,2,2-trifluoroethane.

These products have boiling points in the desired range, they are chemically inert under the process conditions employed and they have the required properties of solvent-miscibility and nonsolvent power for the polymers. They are available in satisfactory purity and are readily separable from useful solvents by fractional distillation. The most preferred coagulants are 1,1,1,2-tetrachloro-2,2-difluoroethane and 1,1,2-trichloro-1,2,2-trifluoroethane.

There is no restriction as to the proportion of solvent and coagulant. It is determined by a number of factors as enumerated below.

(1) The solvent power of the solvent used in relation to the polymer. The higher the strength of solution attained, the more production can be obtained from equipment of a given size. Conversely, the stronger the solvent, the more completely it must be eliminated from the cellular polymeric structure. This means that greater dilution with coagulant is necessary, requiring larger equipment size.

(2) The difference in boiling point between solvent and coagulant. If the solvent boils at a considerably lower temperature than the coagulant, it can be removed by evaporation during the drying step before a major amount of coagulant also evaporates. The polymer structure is thus left wet with the inert coagulant, which tends to promote and preserve the desired microporous structure.

(3) If the solvent boils at a higher temperature than the coagulant, it must be more completely removed by extraction from the polymeric structure by the coagulant before drying.

One chief requirement in adding the coagulant to the polymer solution is that too much not be added. It is possible, however, to redissolve the precipitated polymer by adding additional solvent, and subsequently adding coagulant to reprecipitate the polymer in the desired form. When too much coagulant is added, the polymer is seen to be present as strings or globs of solid. Further addition of coagulant will cause the appearance of a second liquid phase as stated previously. Properly, according to the invention, the coagulant is added until a slight cloudiness or opalescence appears in the solution, this being the sign that the end-point is near. Further coagulant is then carefully added until the mass has a definite milky appearance. An increase in viscosity will be evident. The mass is then ready for forming or casting into a regular continuous structure such as a sheet or solid form on a substrate. The substrate will normally be an impervious material such as glass or metal.

Since dissolution of the polymers is usually aided by heating the mixture, the addition of coagulant is conveniently begun at the temperature of the warm solution and continued without additional heating until the first cloudiness appears. The mass is then cooled to near room temperature before the last portion of coagulant is added. Coagulation can be completed at higher temperature, but the optimum proportion of solvent and coagulant will probably vary with varying temperature. Duplication of process conditions is most easily accomplished by performing the final coagulation step at room temperature.

A factor of considerable importance in forming satisfactory microporous structures is the adjustment of polymer concentration so that coagulation occurs from a relatively dilute solution, e.g., one that is from about ⅓ to ½ as concentrated as the original solution before adding coagulant. When coagulation occurs from a concentrated solution, the resultant structure is not sufficiently permeable. The optimum polymer concentration at the coagulation point is usually about 5% to 20%, and the polymer concentration at the point of completion of polymer solution is usually about 15% to 35%, although lower concentrations are operable.

The chlorofluorocarbon containing composition at this stage of the process is unique in its superior stability and flexibility. In other processes for producing microporous structures, the composition at the point of deposition is extremely critical. Slight deviations from the optimum proportion of solvent and coagulant in such instances would lead to an inferior product. Also if too much coagulant were added, it would be almost impossible to satisfactorily redissolve the precipitated polymer to again approach the optimum composition. In the process of the present invention, however, apparently because of the unique properties of the chlorofluorocarbon coagulants, there is a reasonable latitude in the permissible ratio of solvent and coagulant that will result in satisfactory microporous products.

The dispersed polymer in solvent composition is next formed into a regular structure by deposition on a substrate. Commonly sheets of polymer are formed by coating an impervious substrate such as a glass or metal plate with a layer of the somewhat viscous suspension. Thickness of the coating can be adjusted by drawing a doctor knife over the surface. Thickness of the deposited film may vary from about 10 mils to about 150 mils. For clothing and shoe uppers, deposited films of 100–150 mils are most suitable in order to gain adequate strength in the dried product. Thicker films may be obtained but with some loss of the preferred microporous cellular structure. On final drying the thickness of the films will be reduced by about 20% to 40% from the original wet film thickness. The more dilute the polymer dispersion at the time of deposition the greater will be the reduction in film thickness on drying.

Shaped forms can be dipped into the polymer dispersion to obtain films in forms other than flat sheets. Also, continuous films can be obtained by coating on a roller with subsequent coagulation of the polymer structure and removal of the formed sheet.

Next, the solvent is removed from the polymer structure formed from the dispersion. If the coagulant used has a much higher boiling point than the solvent, and the final proportion of solvent to coagulant is sufficiently low, the deposited film can be dried directly. Drying of this sort of film is carried out at room temperature or a slightly elevated temperature (30–40° C.). Because of the large volatility difference, the solvent is removed almost completely before appreciable coagulant evaporates. Completion of the polymeric cellular formation is thus accomplished in the non-solvent coagulant environment, thereby promoting and preserving the desired microporous cellular nature of the film. Finally, the chlorofluorocarbon is removed, e.g., by evaporation.

If the nature of coagulant and solvent do not lend themselves to the above described simple separation of solvent from polymeric structure, the major part of the solvent must be removed by extraction with an inert miscible liquid. This liquid can be any of the chlorofluorocarbon coagulants already disclosed, but in practice will usually be an additional amount of the specific compound already introduced into the composition as coagulant. The coagulant then acts as diluent and extractant to remove solvent from the cells of the polymer structure, so that the liquid remaining has little or no solvent action on the polymer.

The extraction process is carried out by exposing the formed structure while still on the substrate to a relatively large volume of the extracting liquids. This can be accomplished in a vat or tub, or by any method which promotes the contact of extractant with solvent and aids in replacing the one with the other. The operation is normally carried out at ambient temperature but may also be performed at slightly higher temperatures, if desired.

When the solvent has been largely replaced by the inert extracting chlorofluorocarbon, the latter is removed by evaporation at ambient or slightly higher temperature. This operation can be performed at reduced pressure, but care must be taken to avoid destruction of the cellular structure of the polymer. The polymer is normally removed from the substrate on which it was formed before the evaporation of the liquid takes place. The final polymer structure should be dry with no more than a trace of chlorofluorocarbon remaining. No difficulty is normally experienced in achieving dryness, as the opened celled structure does not tend to retard evaporation of the liquid.

Polymer sheets produced by the process of the invention from mixtures of polyurethane and polyvinylchloride have shown tensile strength of about 900–1000 lbs. per square inch. Their flex life and abrasion resistance has been found adequate for use in shoe uppers.

The aesthetic appearance of the finished structures is readily apparent. Their lack of surface flaws and unusual markings makes them extremely desirable for use in clothing.

The polymeric structures can be dyed, buffed or given a variety of treatments to produce the desired appearance for use in various applications.

EXAMPLES

The following examples are intended to be merely illustrative of the invention and not in limitation thereof. Unless otherwise indicated, all quantities are by weight.

Example 1

(A) Dissolving the polymers.—Into a jacketed vessel there were charged 275 parts of dimethylformamide and 275 parts of $CCl_3 \cdot CClF_2$, and agitation was begun. Next there was added 52 parts of polyvinylchloride resin (VYHH Resin-Polyvinylchloride Resin sold by Union Carbide Chemical Co.), and the mixture was stirred at 60–80° C. until solution was complete. Then 173 parts of polyurethane resin (Estane 5701-polyester urethane sold by Goodrich Chemical Co.) were added and stirred at 60–80° C. until a homogeneous solution was obtained.

(B) Adjusting solution to the precipitation point.— To the clear solution 625 parts of $CCl_3 \cdot CClF_2$ were added gradually with continued stirring at 60–80° C. The solution turned slightly cloudy. It was then cooled to about 25° C., and a final 100 parts of $CCl_3 \cdot CClF_2$ were added effecting a milky-looking suspension.

(C) Casting and coagulation.—Some of the milky suspension was poured on a 15 x 10 inch piece of flat, clean glass. The coating was drawn to 120 mils thickness with a doctor knife. The coated glass was submerged in a tank of $CCl_2F \cdot CClF_2$ where it was allowed to stand while the solvent was maintained at room temperature for about 16 hours. The glass plate with cast polymeric coating was then removed from the extractant bath, and the polymeric sheet removed from the glass.

(D) Drying and buffing.—The sheet was dried in a laboratory hood with the exhaust fan drawing air at ambient or slightly elevated temperature across its surface. The top, or "air" side of the polymer sheet was lightly buffed with a leather buffer to leave a suede-like surface appearance.

(E) Dyeing.—The sheet was dyed with the commercial Disperse Dye, "Latyl" Black T. Using a dye bath containing 100 g. per liter of the dye composition, the polymer sheet was immersed in the dye bath at 98° C. for 5 minutes, then removed and thoroughly rinsed with tap water. After drying in the air at room temperature, the polymer sheet can optionally be spray-coated with cellulose acetate butyrate. The sheet was then ready for use as material for shoe uppers or other apparel.

Example 2

In a laboratory flask 930 parts of dimethylformamide and 930 parts of 1,1,2-trichloro-1,2,2-trifluoroethane were mixed at room temperature. Then 104 parts of polyvinylchloride resin (VYHH Resin-Polyvinylchloride Resin sold by Union Carbide Chemical Co.) were added with agitation, and the mixture was heated to about 70° C. while the polymer dissolved. Then 346 parts of polyurethane resin (Estane 5701-polyester urethane sold by Goodrich Cheminal Co.) were added and agitation and heating continued until a clear solution was attained. Without cooling additional 1,1,2-trichloro-1,2,2-trifluoroethane was gradually added until a slight cloudiness appeared. The mixture was then cooled to room temperature, and additional 1,1,2-trichloro-1,2,2-trifluoroethane added until the solution was definitely milky. Beyond the original 930 parts of cosolvent, an additional 690 parts of chlorofluorocarbon were required. If soo much chlorofluorocarbon is added, strings of polymer will appear in the mixture. The milky material was poured onto a large glass plate and drawn to about 100 mils thickness with a doctor knife. The plate and coating were then immersed in a tank of 1,1,2-trichloro-1,2,2-trifluoroethane for 17 hours. The polymer sheet was stripped from the glass plate and allowed to dry in a laboratory fume hood at room temperature for 24 hours. The completed sheet was quite permeable to water vapor and had excellent resistance to tearing.

Example 3

To a 2 liter laboratory flask were added 291.7 parts of methylene chloride and 28.9 parts of the poly-ether-polyester resin disclosed in Example 1 of Belgian Pat. 753,040, and the mixture agitated and gently heated to 36° C. to dissolve the polymer. When solution was complete, 57.7 parts of polyvinyl chloride resin (VYHH sold by Union Carbide Chemical Co.) were added over about 20 minutes. When all was dissolved, and temperature of the mass was 40° C., addition of $CCl_3 \cdot CClF_2$ was begun, using 200 part portions of the coagulant added at 10 to 15 minute intervals. Temperature was maintained at about 50° C. Test sheets were cast on a glass plate at intervals. When 1300 parts of the coagulant had been added, several sheets were cast by pouring the milky-appearing material onto a large glass plate and drawing to about 100 mils thickness with a doctor knife. The sheets were allowed to dry in air at room temperature for 24 hours without extraction of the solvent. The dry sheets showed outstanding permeability.

The foregoing detailed description has been given for clarity of understanding only and no unnecessary limitations are to be understood therefrom. The invention is not limited to exact details shown and described for obvious modifications will occur to one skilled in the art.

The embodiments in which an exclusive property or privilege is claimed are defined as follows:

I claim:

1. A process for preparing microporous cellular polymeric structures which comprises:
    (A) dissolving a solid polymer in a non-aqueous solvent selected from the group consisting of dimethylformamide, methylene chloride, methyl ethyl ketone, diethyl ether, dimethylacetamide, tetrahydrofuran and mixtures thereof;
    (B) adding thereto a liquid chlorofluorocarbon or mixture of liquid chlorofluorocarbons in an amount sufficient to coagulate the polymer thus forming a dispersion of polymer in solvent wherein each such chlorofluorocarbon has 1 to 4 carbon atoms and is selected from the group consisting of 1,1,2,2-tetrachloro-1,2-difluoroethane, 1,1,1,2 - tetrachloro-2,2-difluoroethane, 1,1,2-trichloro-1,2,2-trifluoroethane and 1,1,1-trichloro-2,2,2-trifluoroethane;
    (C) forming the resulting polymer dispersion into a regular continuous structure;
    (D) removing the solvent from said regular continuous polymer dispersion structure by evaporation or extraction with an inert miscible liquid; and
    (E) removing the chlorofluorocarbon from the structure.

2. A process according to claim 1 wherein the solvent of (A) is methylene chloride, dimethylformamide or a mixture thereof.

3. A process according to claim 1 wherein the polymer of (A) is selected from the group consisting of polyacrylics, polystyrene, polyamides, polyvinyl halides, polyurethanes and mixtures thereof.

4. The process according to claim 3 wherein the polymer is a mixture of polyurethane and polyvinylchloride.

5. A process according to claim 4 wherein the weight ratio of polyurethane to polyvinylchloride is from 4:1 to 1:3.

6. A process according to claim 1 wherein the inert miscible liquid of (D) is the same as the chlorofluorocarbon or mixture of chlorofluorocarbons used in (B).

References Cited

UNITED STATES PATENTS

| 3,100,721 | 8/1963 | Holden | 117—63 |
| 3,190,766 | 6/1965 | Yuan | 117—63 |
| 3,492,154 | 1/1970 | Einstman | 117—135.5 |
| 3,490,937 | 1/1970 | Pietsch | 117—63 |
| 3,491,173 | 1/1970 | Kobsa | 260—2.5 |
| 3,674,719 | 7/1972 | Jenkins | 260—2.5 |

FOREIGN PATENTS

| 1,248,926 | 8/1967 | Germany | 260—2.5 |

MAURICE J. WELSH, JR., Primary Examiner

E. C. RZUCIDLO, Assistant Examiner

U.S. Cl. X.R.

117—63, 135.5; 161—159, 190; 260—2.5 R, 2.5 E, 2.5 P